United States Patent [19]

Fenner et al.

[11] 4,158,465

[45] Jun. 19, 1979

[54] BOX-BODY CONSTRUCTION FOR BUSSES

[75] Inventors: Hans Fenner, Evilard; Wilhelm Auwärter, Gümlingen; Karl-Heinz Stark, Muttenz, all of Switzerland

[73] Assignee: Ramseier & Jenzer AG, Carosseriewerke Bern, Bern, Switzerland

[21] Appl. No.: 838,987

[22] Filed: Oct. 3, 1977

[30] Foreign Application Priority Data

Apr. 7, 1977 [DE] Fed. Rep. of Germany ....... 2715549

[51] Int. Cl.² .......................................... B61D 17/08
[52] U.S. Cl. ...................................... 296/193; 52/11; 105/401; 296/178
[58] Field of Search .............. 296/28 R, 28 A, 137 R; 105/401, 409; 52/11, 48–56, 45–47, 588

[56] References Cited

U.S. PATENT DOCUMENTS

| 2,250,523 | 7/1941 | Christiansen et al. | 105/401 X |
| 3,035,161 | 5/1962 | Kalt | 296/28 A X |
| 3,774,553 | 11/1973 | Kunst et al. | 105/401 |
| 3,981,107 | 9/1976 | Schubach | 296/28 A |

*Primary Examiner*—Joseph F. Peters, Jr.
*Assistant Examiner*—Gene A. Church
*Attorney, Agent, or Firm*—Max Fogiel

[57] ABSTRACT

A box-shaped body for busses in which the sidewalls have windows and some of the sidewalls have doors. A roof is connected to the sidewalls, and at least the lengthwise sidewalls of the box-shaped body are connected to the roof by a two-part roof rim profile. A section of this roof rim profile is associated with the sidewalls and forms a continuous upper arch section directly connected to an upper edge of the windows. The roof rim profile has also a section associated with the roof, which is box-shaped and supplements the upper arch section. A self-centering detent connection with undercuts is provided at a point connecting the upper arch section with the box-shaped section of the roof rim profile. The inside of the upper arch section and the box-shaped section each have a lug for hanging a covering creating a space of triangular cross-section for holding lamps, cables, ventilation channels and similar elements. The covering is formed by individual sectioned plates which have ribs corresponding to the lugs, and they also have strips for inserting advertising posters and lamp cover panes, for example. The lugs and/or strips have rubber gaskets for noiseless suspension of the cover plates and other posters. The upper arch section may be reinforced with a lattice framework and have a rain strip on its outside.

11 Claims, 3 Drawing Figures

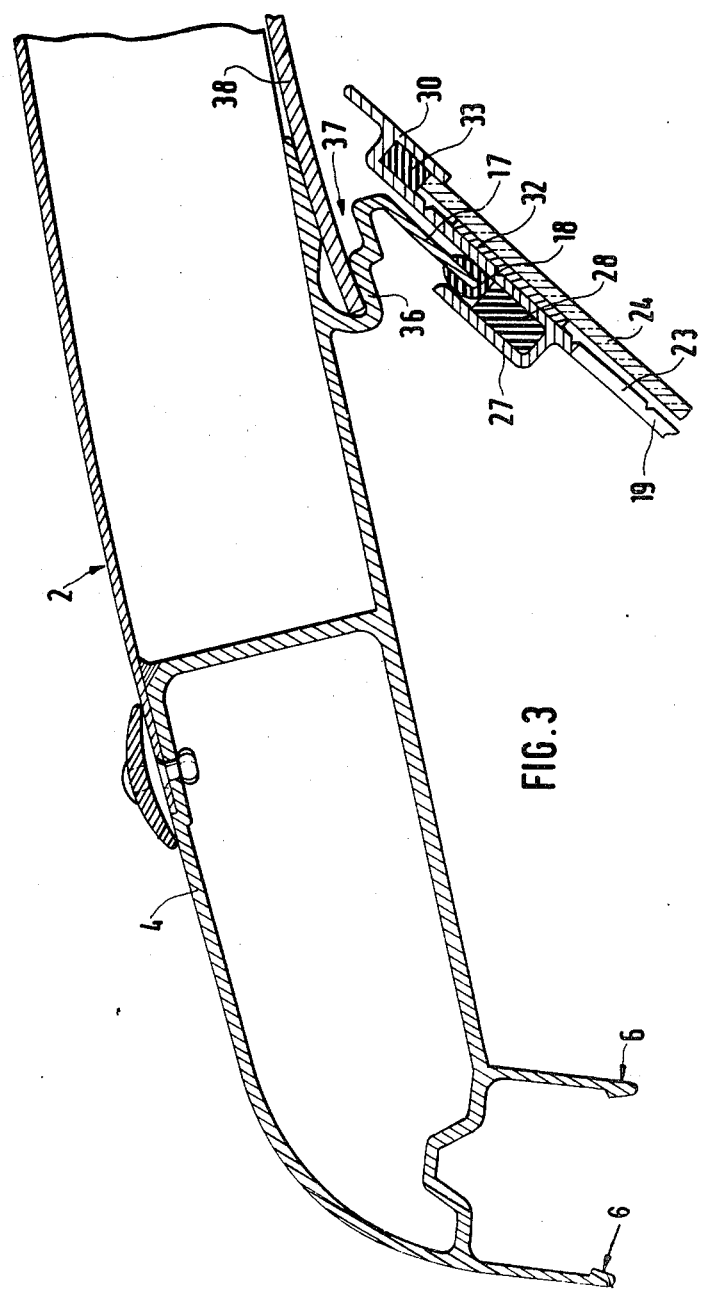

BOX-BODY CONSTRUCTION FOR BUSSES

BACKGROUND OF THE INVENTION

The present invention relates to a box-body construction for busses, with sidewalls having windows and some of the sidewalls having doors, and a roof connected thereto.

There is already known a box-body construction where the sidewalls are erected in column structure, with the columns passing upward between the windows. On these columns a roof is mounted reaching to the top edge of the windows. This has the disadvantage that the windows must be very tall, so that, particularly during the summer, there is considerable entry of heat into the bus. Also, this bus lacks a simple possibility for mounting various items, such as lamps, baggage nets, ventilation channels for individual heat ventilation, etc.

There are also known box-shaped bodies with grid construction. Here a welded framework is used which is coated with sheet metal on the in- and outsides. This is the conventional method of constructing a box-body. It requires much labor cost.

The German Pat. No. 1,780,606 shows a box-body, for busses, whose sidewalls meet the roof along an edge where in the region between the roof and the sidewall of the box-body, roof hoops and spar-like sidewall columns rigidly connected to them are reinforced by triangular sockets. The intermediate spaces hold roller blinds. This design also requires a framework to be built separately.

Accordingly, it is the object of the present invention to provide a box body of the type described above where the sidewalls and the roof are preassembled separately and after the sidewalls are installed, the roof is placed as a unit to complete the box structure. This assembly provides a space suitable for various items, such as lamps, cables, ventilation ducts, loop and trunk layout, etc.

Another object of the present invention is to provide an arrangement of the foregoing character which is substantially simple in construction and may be economically fabricated.

A further object of the present invention is to provide an arrangement, as described, which may be readily maintained in service.

SUMMARY OF THE INVENTION

The objects of the present invention are achieved by providing that at least the lengthwise sidewalls of the box body are connected to the roof via a two-part roof rim profile, with the section assigned to the sidewalls forming a continuous upper arch section directly connected to the upper edge of the windows; the section associated with the roof is the box section supplementing the upper arch section. At the point connecting the upper arch section with the box section, a self-centering detent connection having undercuts is provided. The roof edge section thus has two sections of which one is associated with the sidewall and the other with the roof. The upper arch profile closes the sidewall on top and is used for the force transfer in the sidewall area. It is similar with the box section relative to the roof. The box section, so-to-speak, forms a roof frame. The self-centering detent connection, having undercuts, between the two sections permits a simple, quick and safe assembly. Through partial welds, the detent connection and the assembly of the sections can be reinforced further.

Locating these two sections in the area of the roof edge does not produce interference, but has the additional advantage that it creates a space suitable for the storage of many items. Through this construction, the bus has a somewhat higher, more box-shaped appearance without the window areas having to be enlarged unduly with negative results.

On the inside of the upper arch section (profile) and of the box section each, there is a lug for suspending a cover, creating a space of triangular cross-section for accommodating lamps, cables, ventilation channels, etc. This space is not needed for headspace in the bus.

The roof is formed by individual sectioned plates which have ribs associated with the lugs and strips for inserting advertising posters, lamp cover panes, etc. In case of a lamp installation, the plate will have a hole which is then closed by a transparent or translucent lamp cover pane. In this manner, direction posters, and time schedules can be located on the strips.

The lugs and/or the strips are provided with rubber gaskets for the noisefree suspension of cover plates and the other sheets. This creates a plug (or slide) connection which permits easy interchange but does not make noise during travel.

The upper arch section is reinforced like a lattice framework and on its outside has a rain strip. The reinforcement of the upper arch section can be seen in connection with its task within the sidewall. In addition, connecting forces are absorbed from the roof via the box section. The location of the rain strip as integral component of the upper arch section by itself reduces the assembly time of the box body by several hours in comparison with a separate location of a rain strip. In this manner, the upper arch section, in connection with a possible center arch section, may absorb the principal forces in the sidewall area, and it is continuous even above the door openings.

The detent connection between box section and upper arch section comprises a detent connecting element formed in the region of the outer and the inner surface; between the detent connection elements, the upper arch section has a centering area which preferably is a wedge-shaped surface so that an easy placing of the roof on the erected sidewalls is possible. The centering area in the center region has a groove with a sealing compound which is pressed by the detent connection between box section and upper arch section. This sealing compound is necessary in order to make the box body watertight in the region of the roof rim section. The detent connection element on the inside of the roof rim section is secured by partial welds. These welds are covered within the triangular space. The outer detent connection element is not additionally secured, so that the smooth surface of the profiles (section) on the outside remains preserved.

The box section has a pocket for inserting a roof casing. The pocket is preferably in two stages and the wall bounding the pocket on its free end bears the lug of the box profile. In this manner it is possible to attach a roof casing on the inside very easily, for example, a coated fiber board or a rug covering, etc. Since the hook-in plates project beyond the pocket or cover it partially, a functional design and easily assembled connection of the parts is assured.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 shows the box section with part of the roof to scale.

DESCRIPTION OF THE PREFERRED EMBODIMENTS

Figure 1:
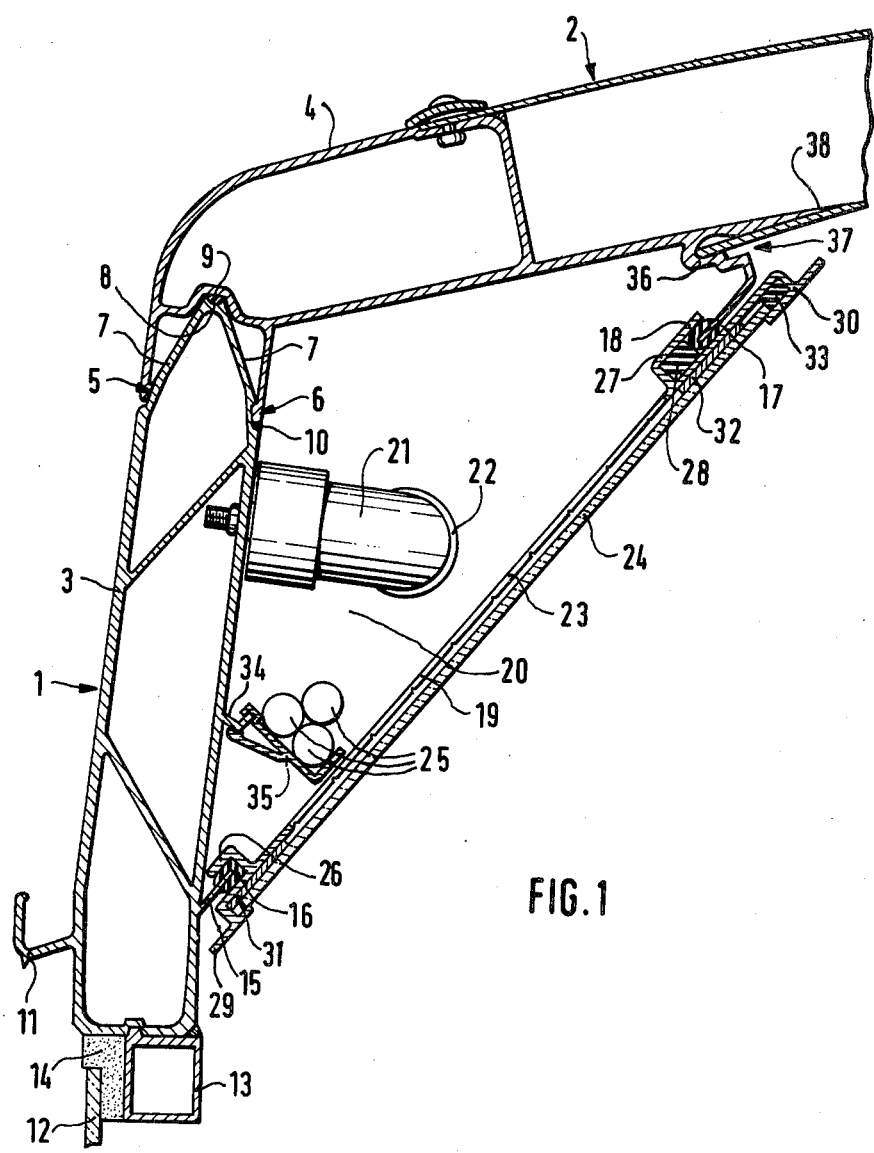
FIG. 1 shows a reduced size section in the area for connection between roof and sidewall of the box body.
Figure 2:
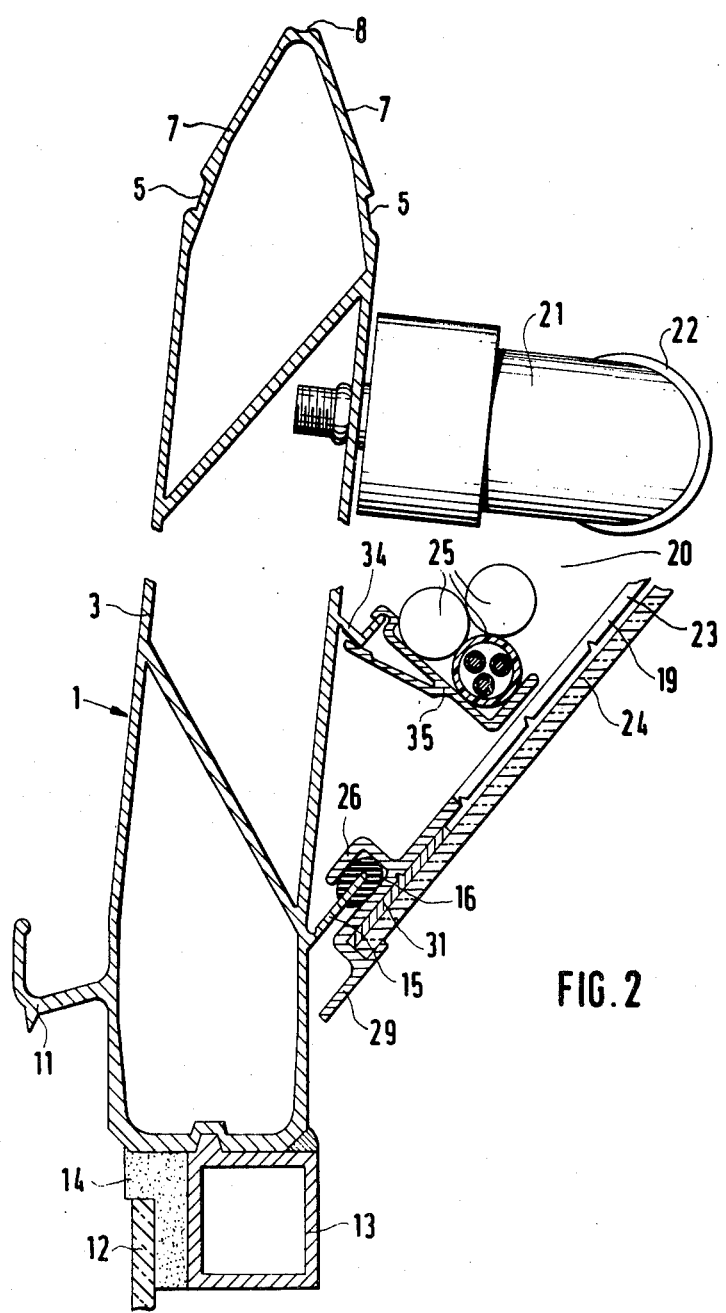
FIG. 2 shows the upper arch section of the sidewall to scale.

The sidewall 1 of which only the upper portion is shown, is connected to roof 2 which also is only partially shown, in the area of the two part roof rim section. The sidewall 1 is associated with the upper-arch section 3 while box section 4 belongs to roof 2. The upper arch section 3 so-to-speak forms the termination of the sidewall in the upward direction, while the box section 4 holds roof 2, or forms a frame for this roof.

For easy connection of the pre-assembled roof with the box section 4 and the assembled and erected sidewalls 1, detent connection elements 5 and 6 are formed inside and outside between the upper arch section 3 and the box section 4. These detent connection elements form the detent connection 5, 6 which also has a centering surface 7 so the roof can be lowered on the sidewalls more easily. The upper arch section 3 is reinforced like a framework and has the task of transmitting forces at the sidewall. At its upper end it has a groove 8 in which a sealing compound 9 is placed which, when joining the detent connection 5, 6, is pressed on to provide a seal. As soon as the roof 2 has been placed on sidewalls 1, the partial welds 10 in the areas of the inner detent connection elements 6 are made. They also secure and connect the sidewalls with the roof 2.

The upper arch section 3 on its outside has a rain strip 11 which is an integral part of the section so that additional assembly is not necessary. In the lower region, the upper arch section 3 is designed for connecting the windows 12, with the connection of a window section 13 also possible. By means of the adhesive coat 14, windows 12 are mounted. Hence they also have a carrying function.

On the inside, the upper arch section 3 has a lug 15 which is coated with a rubber section 16. Similarly, the box section 4 has a lug 17 which is also coated with a rubber section 18. In this manner, it is possible to connect a hang-in plate 19 with the lugs 15, 17, and to bound the enclosed triangular space 20, or to hide the individual items there. For example, space 20 may hold lamp figures 21 with lamps 22. Of course, in this case the plate 19 has a hole 23 which is covered by a lamp cover pane 24 which is preferably transparent or translucent. But it is also possible to locate cables 25 in the triangular space 20, or ventilation channels or similar items, which must be easily accessible.

The plates 19 are made in sections. At their upper and lower end they have, for hanging to the lugs 15, 17, ribs 26, 27 which have the form shown in the drawing. A very compressible rubber section 28 is placed in the free space between rib 27 and the plate 19. For inserting the plate 19, it is passed with rib 27 over the rubber section 18 and pressed upward so far that rib 26 can pass over the rubber section 16. Then the rubber section 28 expands again slightly so that the rib 26 grasps the rubber section 16 and the plate 19 is held noiselessly on lugs 15, 17. The plate 19 also has strips 29, 30 which in similar fashion are used for holding the lamp cover pane 24 or an advertising poster or a time schedule, etc. Here, also, rubber sections 31, 32 and 33 are provided which prevent noise and make possible a rubber-mounted seating of the lamp pane 24 on strips 29, 30.

For holding the cables 25, a separate section projection 34 may be provided at the upper arch section; this projection accommodates a cable carrier 35 on which the cables 25 are located.

The box section 4 in the direction of the roof 2 has a wall 8 on whose free end the lug 17 is formed. This wall 36 simultaneously forms a two-stage pocket 37 for hanging or inserting a roof casing 38 which, for example, may be a coated hard fiber board or can hold a rug which comes to lie in the second stage of pocket 37.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. An upper side carrier for busses comprising: a roof lengthwise carrier and a sidewall with an upper arch connected via connecting means and being continuous lengthwise and having centering means; said roof lengthwise carrier and said upper arch having two-shell hollow sections; an upper lengthwise surface of said upper arch having a roof-shaped centering surface and lengthwise continuous detent grooves, a contact surface of said roof lengthwise carrier having a recess for serving as corresponding centering surface to at least part of the length of said upper arch; said recess having lengthwise extending detent tongues substantially matching said detent grooves; said upper arch and said roof lengthwise carrier having associated tongues on the inside for suspending a panel.

2. A box-shaped body for busses as defined in claim 1 wherein said panel comprises individual sectioned plates having ribs corresponding to said tongues, and strips for insertion of sheet-shaped means.

3. A box-shaped body for busses as defined in claim 2 including rubber gaskets on at least said tongues for noiseless suspension of said sheet-shaped means.

4. A box-shaped body for busses as defined in claim 1 including lattice framework means for reinforcing said upper arch, and an integrally formed rain strip on the outside of said upper-arch.

5. A box-shaped body for busses as defined in claim 1 wherein said upper arch is continuous also above door openings.

6. A box-shaped body for busses as defined in claim 1 including partial welds for reinforcing a detent connection on the inside of said roof lengthwise carrier.

7. An upper side carrier as defined in claim 1 wherein said centering surface of said upper arch has a peak with a groove having an inserted sealing compound pressed against said centering surface of said roof lengthwise carrier.

8. An upper side carrier as defined in claim 1 including a roof casing, said roof lengthwise carrier having a pocket for insertion of said roof casing.

9. An upper side carrier as defined in claim 8 wherein said pocket has two stages, a wall bounding said pocket at a free end thereof having tongue means of said roof lengthwise carrier.

10. An upper side carrier as defined in claim 1 wherein said roof lengthwise carrier and said upper arch are continuous reinforced carriers forming a box-shaped unit for providing increased stiffness and straightness, said upper arch and said roof lengthwise carrier with said tongues for suspending said panel forming a storage space.

11. An upper side carrier as defined in claim 1 wherein said centering surface of said upper arch has a peak with a groove having an inserted sealing compound pressed against said centering surface of said roof lengthwise carrier; a roof casing, said roof lengthwise carrier having a pocket for insertion of said roof casing; said pocket having two stages; a wall bounding said pocket at a free end thereof having tongue means of said roof lengthwise carrier; said roof lengthwise carrier and said upper arch being continuous reinforced carriers forming a box-shaped unit for providing increased stiffness and straightness, said upper arch and said roof lengthwise carrier with said tongues for suspending said panel forming a storage space; said upper arch having a lower portion for connection of windows with adhesive means; said panel comprising individual sectioned plates having ribs corresponding to said tongues, and strips for insertion of sheet-shaped means; rubber gaskets on at least said tongues for noiseless suspension of said sheet-shaped means; lattice framework means for reinforcing said upper arch, and an integrally formed rain strip on the outside of said upper-arch; said upper arch being continuous also above door openings; partial welds for reinforcing a detent connection on the inside of said roof lengthwise carrier.

* * * * *